United States Patent
Sanchez

(10) Patent No.: US 12,033,176 B2
(45) Date of Patent: *Jul. 9, 2024

(54) SYSTEMS AND METHODS FOR TELEMATICS DATA MARKETPLACE

(71) Applicant: BlueOwl, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/727,597

(22) Filed: Apr. 22, 2022

(65) Prior Publication Data

US 2022/0253890 A1 Aug. 11, 2022

Related U.S. Application Data

(63) Continuation of application No. 16/751,644, filed on Jan. 24, 2020, now Pat. No. 11,341,525.

(51) Int. Cl.
*G06Q 40/08* (2012.01)
*G06F 21/62* (2013.01)
(Continued)

(52) U.S. Cl.
CPC ..... *G06Q 30/0236* (2013.01); *G06F 21/6263* (2013.01); *G06Q 20/042* (2013.01);
(Continued)

(58) Field of Classification Search
CPC ............. G06Q 30/0236; G06Q 20/042; G06Q 20/065; G06Q 30/0215; G06Q 40/08;
(Continued)

(56) References Cited

U.S. PATENT DOCUMENTS 7,424,438 B2 9/2008 Vianello
7,818,588 B2 10/2010 Duri et al.
(Continued)

FOREIGN PATENT DOCUMENTS

AU 2018101217 A4 9/2018
BG 2743 U1 8/2017
(Continued)

OTHER PUBLICATIONS

"Optimize flee operational efficiency with telematics", Translated by Content Engine LLC., CE Noticias Financieras, English, Proquest Document ID: 2888820790, Nov. 10 (Year: 2023).*
(Continued)

*Primary Examiner* — Frantzy Poinvil
(74) *Attorney, Agent, or Firm* — BRYAN CAVE LEIGHTON PAISNER LLP

(57) ABSTRACT

A telematics data marketplace (TDM) computing device including a processor in communication with a memory device is provided. The processor may be configured to: (i) receive registration data from a provider, wherein the registration data includes desired user data sets and an associated purchase price, (ii) retrieve, from the memory device, user data associated with a plurality of users, wherein the user data includes at least telematics data, (iii) match the provider to one or more users of the plurality of users based upon the user data associated with the users matching the desired user data sets of the provider, (iv) prompt the matched users to allow the provider access to the user data for the purchase price, (v) transmit the user data of the matched users to the provider, and (vi) provide the matched users with a reward corresponding to the purchase price of the desired user data set.

20 Claims, 7 Drawing Sheets

(51) Int. Cl.
*G06Q 20/04* (2012.01)
*G06Q 20/06* (2012.01)
*G06Q 30/0207* (2023.01)
*G01S 19/49* (2010.01)

(52) U.S. Cl.
CPC ....... *G06Q 20/065* (2013.01); *G06Q 30/0215* (2013.01); *G06Q 40/08* (2013.01); *G01S 19/49* (2013.01)

(58) Field of Classification Search
CPC .............. G06Q 20/02; G06Q 20/3224; G06Q 20/40155; G06F 21/6263; G06F 21/6245; G06F 2221/2111; G01S 19/49
USPC ........................................................ 705/3–44
See application file for complete search history.

(56) References Cited

U.S. PATENT DOCUMENTS

| | | | |
|---|---|---|---|
| 7,904,332 B1* | 3/2011 | Merkley, Jr. ....... | G06Q 30/0215 705/14.1 |
| 7,917,253 B2 | 3/2011 | Inbarajan et al. | |
| 8,044,809 B2 | 10/2011 | Farmer | |
| 8,136,146 B2 | 3/2012 | Hahn et al. | |
| 8,140,359 B2 | 3/2012 | Daniel | |
| 8,160,952 B1 | 4/2012 | Fell et al. | |
| 8,239,220 B2 | 8/2012 | Kidd et al. | |
| 8,364,613 B1 | 1/2013 | Lin et al. | |
| 8,527,302 B2 | 9/2013 | Johnson, Jr. et al. | |
| 8,554,600 B2 | 10/2013 | Reisman | |
| 8,560,456 B2 | 10/2013 | Williams | |
| 8,577,703 B2 | 11/2013 | McClellan et al. | |
| 8,595,034 B2 | 11/2013 | Bauer et al. | |
| 8,712,893 B1 | 4/2014 | Brandmaier et al. | |
| 8,731,627 B2 | 5/2014 | Inabathuni et al. | |
| 8,892,451 B2 | 11/2014 | Everett et al. | |
| 8,971,887 B2* | 3/2015 | Das ....................... | H04W 48/18 455/435.2 |
| 9,087,332 B2 | 7/2015 | Bagherjeiran et al. | |
| 9,135,756 B2 | 9/2015 | Doughty et al. | |
| 9,306,924 B2 | 4/2016 | Lehmann | |
| 9,489,640 B2 | 11/2016 | Neuhauser et al. | |
| 10,134,042 B1 | 11/2018 | Prasad et al. | |
| 10,163,163 B1 | 12/2018 | He et al. | |
| 10,216,485 B2 | 2/2019 | Misra et al. | |
| 10,360,576 B1 | 7/2019 | Hsu-Hoffman | |
| 10,373,257 B1 | 8/2019 | Iqbal et al. | |
| 10,423,982 B2 | 9/2019 | Wasserman et al. | |
| 10,430,745 B2 | 10/2019 | Rani et al. | |
| 10,462,225 B2 | 10/2019 | Chen et al. | |
| 10,510,120 B1 | 12/2019 | Roll | |
| 10,580,081 B2 | 3/2020 | Rackley, III et al. | |
| 10,664,920 B1 | 5/2020 | Roll et al. | |
| 10,713,728 B1 | 7/2020 | Roll et al. | |
| 2003/0139179 A1 | 7/2003 | Fuchs et al. | |
| 2003/0200121 A1 | 10/2003 | Santoloci | |
| 2004/0139034 A1 | 7/2004 | Farmer | |
| 2004/0180647 A1 | 9/2004 | Schwinke et al. | |
| 2006/0253307 A1 | 11/2006 | Warren et al. | |
| 2007/0027726 A1 | 2/2007 | Warren et al. | |
| 2008/0288889 A1 | 11/2008 | Hunt et al. | |
| 2009/0006870 A1 | 1/2009 | Duri et al. | |
| 2009/0089160 A1 | 4/2009 | Oesterling | |
| 2010/0030582 A1 | 2/2010 | Rippel et al. | |
| 2010/0030586 A1 | 2/2010 | Taylor et al. | |
| 2010/0063874 A1* | 3/2010 | Keithley ............ | G06Q 30/0222 705/14.23 |
| 2010/0076646 A1 | 3/2010 | Basir et al. | |
| 2010/0114734 A1 | 5/2010 | Giuli et al. | |
| 2010/0131303 A1 | 5/2010 | Collopy et al. | |
| 2010/0268619 A1 | 10/2010 | Farmer | |
| 2011/0130916 A1 | 6/2011 | Mayer | |
| 2012/0036038 A1 | 2/2012 | Farmer | |
| 2012/0059701 A1* | 3/2012 | van der Veen ....... | G06Q 20/387 705/14.17 |
| 2012/0066007 A1 | 3/2012 | Ferrick et al. | |
| 2012/0072244 A1 | 3/2012 | Collins et al. | |
| 2012/0271689 A1 | 10/2012 | Etheredge et al. | |
| 2012/0290308 A1 | 11/2012 | Detwiller et al. | |
| 2013/0046596 A1* | 2/2013 | Roh ................... | G06Q 30/0215 705/14.23 |
| 2013/0138460 A1 | 5/2013 | Schumann et al. | |
| 2013/0179198 A1 | 7/2013 | Bowne et al. | |
| 2013/0304576 A1* | 11/2013 | Berland ............. | G06Q 30/0236 705/14.53 |
| 2014/0032045 A1 | 1/2014 | Smirnov et al. | |
| 2014/0058761 A1 | 2/2014 | Freiberger et al. | |
| 2014/0164579 A1 | 6/2014 | Douthitt et al. | |
| 2014/0172467 A1 | 6/2014 | He et al. | |
| 2014/0229207 A1 | 8/2014 | Swamy et al. | |
| 2014/0278574 A1 | 9/2014 | Barber | |
| 2014/0316825 A1 | 10/2014 | Van et al. | |
| 2014/0359552 A1 | 12/2014 | Misra et al. | |
| 2014/0372221 A1 | 12/2014 | Momin et al. | |
| 2015/0134455 A1 | 5/2015 | Gorpynich et al. | |
| 2015/0269681 A1 | 9/2015 | Kalinadhabhotla | |
| 2015/0294565 A1 | 10/2015 | Follmer et al. | |
| 2016/0035020 A1 | 2/2016 | Du Preez | |
| 2016/0203278 A1 | 7/2016 | Shoemaker | |
| 2016/0225095 A1 | 8/2016 | Biemer et al. | |
| 2016/0267396 A1 | 9/2016 | Gray et al. | |
| 2017/0053295 A1 | 2/2017 | Tiell et al. | |
| 2017/0054611 A1 | 2/2017 | Tiell | |
| 2017/0124660 A1 | 5/2017 | Srivastava | |
| 2017/0255981 A1 | 9/2017 | Van Niekerk et al. | |
| 2017/0257345 A1 | 9/2017 | Westra et al. | |
| 2017/0364821 A1 | 12/2017 | Mathur et al. | |
| 2018/0025430 A1 | 1/2018 | Perl et al. | |
| 2018/0075380 A1 | 3/2018 | Perl et al. | |
| 2018/0260908 A1 | 9/2018 | Collopy et al. | |
| 2018/0300816 A1 | 10/2018 | Perl et al. | |
| 2018/0315318 A1 | 11/2018 | Farnham, IV et al. | |
| 2019/0031097 A1 | 1/2019 | O'Herlihy et al. | |
| 2019/0050870 A1 | 2/2019 | Chen | |
| 2019/0086229 A1 | 3/2019 | Chintakindi | |
| 2019/0102689 A1 | 4/2019 | Lassoued et al. | |
| 2019/0102840 A1 | 4/2019 | Perl et al. | |
| 2019/0147513 A1 | 5/2019 | Giuli et al. | |
| 2019/0347582 A1 | 11/2019 | Allen et al. | |
| 2019/0384870 A1 | 12/2019 | Shiraishi et al. | |
| 2020/0013498 A1 | 1/2020 | Gelber | |
| 2020/0103892 A1 | 4/2020 | Cella et al. | |
| 2020/0108840 A1 | 4/2020 | Andres et al. | |
| 2020/0126324 A1 | 4/2020 | Hutchins et al. | |
| 2020/0211122 A1 | 7/2020 | Chen et al. | |
| 2020/0357075 A1 | 11/2020 | Dahl | |
| 2023/0061842 A1* | 3/2023 | Gibson ............. | G06Q 30/0218 |

FOREIGN PATENT DOCUMENTS

| | | |
|---|---|---|
| CN | 107845039 A | 3/2018 |
| CN | 108171708 A | 6/2018 |
| CN | 108492053 A | 9/2018 |
| CN | 109118055 A | 1/2019 |
| CN | 110852894 A | 2/2020 |
| GB | 2523227 A | 8/2015 |
| GB | 2548738 A | 9/2017 |
| JP | 4494791 B2 | 6/2010 |
| KR | 10-1823015 B1 | 1/2018 |
| KR | 10-2129324 B1 | 7/2020 |
| WO | 2006/062693 A2 | 6/2006 |
| WO | 2008/071064 A1 | 6/2008 |
| WO | 2014/106299 A1 | 7/2014 |
| WO | 2015/187558 A1 | 12/2015 |
| WO | 2017/195228 A1 | 11/2017 |
| WO | 2018/007953 A1 | 1/2018 |
| WO | 2020/015526 A1 | 1/2020 |

OTHER PUBLICATIONS

"Commercial Vehicle Telematics Market Report", Proquest Document Id: 2047381839, Asia News Monitor Jun. 1 (Year: 2018).

(56) References Cited

OTHER PUBLICATIONS

Abdelrahman et al., "Data-driven Robust Scoring Approach for Driver Profiling Applications", doi: 10.1109/GLOCOM.2018.8647971, Dec. 2018, pp. 1-6.

Alghuson, "An Integrated Score-Based Traffic Law Enforcement and Network Management in Connected Vehicle Environment", Southern Methodist University, 2020, pp. 1-227.

Analytics and insights services that help you understand your book of business and individual customers from every angle, Insurance & Mobility Solutions, Retrieved from https://ims.tech/analytics/, Jul. 2020, 11 pages.

Baecke et al., "The value of vehicle telematics data in insurance risk selection processes", Decision Support Systems, vol. 98, Jun. 2017, pp. 69-79.

Bian et al., "Good drivers pay less: A study of usage-based vehicle insurance models", Transportation Research Part A: Policy and Practice, vol. 107, 2018, pp. 20-34.

Bourque, "eBay-Like Bidding Meets Facebook with Social Media Auction App BuddyBid", SocialMediaToday, Retrieved from https://www.socialmediatoday.com/news/ebay-like-bidding-meets-facebook-with-social-media-auction-app-buddybid/454231/, Jun. 2015, pp. 1-3.

Cheng et al., Research on safe Driving Scoring System and Personalized Ratemaking of Vehicle Insurance based on OBD Data, the 3rd International Conference on Crowd Science and Engineering (ICCSE'18). Doi: 10.11453265689.3265696, Jul. 28-31, 2018, 8 pages.

Crawford, Bradley, "Mew Methods of Payment and New Forms of Money", Banking & Finance Law Review 20:3: 393-409. HAB Press Limited, Toronto, Canada. (Year: 2004).

Driving score, "Score and rate consistently from multiple sources", Risk Solutions, Retrieved from https://risk.lexisnexis.com/products/driving-score, Jul. 2020, pp. 1-3.

Duri et al., "Data Protection and Data Sharing in Telematics", Mobile Networks and Applications, vol. 9, No. 6, 2004, pp. 693-701.

Duri et al., "Framework for Security and Privacy in Automotive Telematics", In Proceedings of the 2nd international workshop on Mobile commerce, 2002, pp. 25-32.

Fan et al., "A Comparison of Underwriting Decision Making Between Telematics-Enabled UBI and Traditional Auto Insurance", Advances in Management and Applied Economics, vol. 7, No. 1, 2017, pp. 17-30.

FICO Safe Driving Score, Retrieved from https://www.fico.com/en/resource-download-file/4571. See highlighted sections, Jan. 2020, 3 pages.

FloowDrive, "The Floow", Retrieved from https://www.thefloow.com/our-solutions/floowdrive/, Jul. 2020, pp. 1-7.

FloowScore, "The Floow", Retrieved from https://www.thefloow.com/our-solutions/floowscore/, Jul. 2020, pp. 1-3.

Garrison et al., "New Verisk Data Exchange Integration for Insurance Telematics Now Available on the Geotab Marketplace", Verisk, Retrieved from https://www.verisk.com/press-releases/2020/may/new-verisk-data-exchange-integration-for-insurance-telematics-now-available-on-the-geotab-marketplace/, May 2020, 2 pages.

Honcho launches reverse auction car insurance app, Finextra, Retrieved from https://www.finextra.com/pressarticle/79851/honcho-launches-reverse-auction-car-insurance-app, Sep. 2019, pp. 1-4.

How does the car insurance tier system affect my premium?, Cover, Retrieved from https://cover.com/blog/car-insurance-tiers/, Jan. 2020, pp. 1-5.

International Search Report and Written Opinion received for PCT Patent Application No. PCT/US2021/040272, dated Oct. 5, 2021, 8 pages.

International Search Report and Written Opinion received for PCT Patent Application No. PCT/US2021/040282, dated Oct. 5, 2021, 9 pages.

International Search Report and Written Opinion received for PCT Patent Application No. PCT/US2021/040291, dated Oct. 5, 2021, 10 pages.

International Search Report and Written Opinion received for PCT Patent Application No. PCT/US2021/040295, dated Oct. 15, 2021, 8 pages.

International Search Report and Written Opinion received for PCT Patent Application No. PCT/US2021/040308, dated Oct. 14, 2021, 7 pages.

International Search Report and Written Opinion received for PCT Patent Application No. PCT/US2021/040314, dated Oct. 15, 2021, 7 pages.

International Search Report and Written Opinion received for PCT Patent Application No. PCT/US2021/040317, dated Oct. 5, 2021, 13 pages.

International Search Report and Written Opinion received for PCT Patent Application No. PCT/US2021/040320, dated Oct. 5, 2021, 12 pages.

International Search Report and Written Opinion received for PCT Patent Application No. PCT/US2021/040325, dated Oct. 5, 2021, 10 pages.

International Search Report and Written Opinion received for PCT Patent Application No. PCT/US2021/040329, dated Oct. 5, 2021, 11 pages.

Lavendelis et al., "Multi-Agent Auction Based Simulation Tool for an Insurance Policy Market", Applied Computer Systems, vol. 15, No. 1, 2014, pp. 5-13.

Liu et al., "A risky driving behavior scoring model for the personalized automobile insurance pricing", Proceedings of the 2nd International Conference on Crowd Science and Engineering, ICCSE'17. doi: 10.1145/3126973.3126978, 2017, 7 pages.

Machine Learning and FICO Scores, FICO Decisions, Retrieved from https://www.mba.org/assets/Documents/Member%20White%20Papers/Machine_Learning_and_FICO_Scores_4611WP_EN.pdf, 2018, pp. 1-11.

Maerien et al., "A Secure Multi-Application Platform for Vehicle Telematics", Vehicular Technology Conference, 1988, IEEE 38th, 2010, pp. 1-6.

Reininger et al., "A first look at vehicle data collection via smartphone sensors", In 2015 IEEE Sensors Applications Symposium (SAS), 2015, pp. 1-6.

Siami et al., "Generating a Risk Profile for Car Insurance Policyholders: a Deep Learning Conceptual Model", In Australasian Conference on Information Systems, 2017, pp. 1-8.

Snapshot, ConnectedWorld, Retrieved from https://connectedworld.com/ product-items/snapshot/, Aug. 2020, 5 pages.

Telematics Exchange, LexisNexis—Risk Solutions. Retrieved from https://risk.lexisnexis.com/products/telematics-exchange, Jul. 2020, pp. 1-3.

Toledo et al., "Can feedback from in-vehicle data recorders improve driver behavior and reduce fuel consumption?", Transportation Research Part A: Policy and Practice, vol. 94, 2016, pp. 194-204.

Tramer et al., "Stealing Machine Learning Models via Prediction APIs", Proceedings of the 25th USENIX Security Symposium, Aug. 2015, pp. 601-618.

Verma, "Multi-tenancy redefined with admin partitions", https://www.citrix.com/blogs/2014/11/20/multi-tenancy-redefined-with-admin-partitions/, Nov. 2014, 5 pages.

Wang et al., "Consumer Characteristics, Social influence and system Factors on online Group-Buying repurchasing intention", Journal of Electronic Commerce Research, ProQuest Document ID:P1541488270 (Year: 2014).

Weidner et al., "Telematic driving profile classification in car insurance pricing", Annals of actuarial science, vol. 11, No. 2, 2017, pp. 213-236.

Werner, "Analytics behind the perfect risk score & predictive model", Retrieved from https://testbacblog.files.wordpress.com/2018/10/click-here-to-access-octos-white-paper.pdf, Oct. 2018, 12 pages.

Werner, "Increased data connectivity set to take telematics based auto insurance in new directions", Retrieved from https://web.archive.org/web/20180908034100/https://www.willistowerswatson.com/en-US/insights/2016/08/new-data-connectivity-changes-path-of-insurance-telematics, Aug. 2016, 3 pages.

\* cited by examiner

SYSTEMS AND METHODS FOR TELEMATICS DATA MARKETPLACE

This application is a continuation of U.S. patent application Ser. No. 16/751,644, filed Jan. 24, 2020, incorporated by reference herein for all purposes.

TECHNICAL FIELD

The present disclosure relates to vehicle insurance premiums based at least in part upon driving characteristics of a policyholder, and, more particularly, to systems and methods for providing a telematics data marketplace between users and providers.

BACKGROUND

Vehicle insurance provides financial protection against physical damage or bodily injury caused by a vehicular accident. Other financial protections may be provided, such as vehicle theft or damage caused by natural disasters. Conventionally, car insurance rates, or premiums, are typically determined based upon a driver's age and driving history, car make, model, and year, among a myriad of other factors.

Some vehicle insurance companies provide premium discounts to drivers that exhibit safe driving characteristics. Discounts are typically calculated based upon annual mileage and basic driving characteristics, such as braking, speed, time of day travel, acceleration rates, and fast cornering. Vehicles may be equipped with navigation/telematics systems capable of tracking driving characteristics. For example, a mobile device can be carried by a driver during vehicle operation that may automatically track the driver's driving behavior. Tracking is typically done via one or more integrated sensors or other devices, such as geo-spatial positioning modules, accelerometers, and gyroscopes. These devices can also be integrated into the vehicle telematics system and can track this data.

Satellite navigation systems such as global positioning system (GPS) utilize satellites to provide geo-spatial positioning for a variety of applications. A GPS-equipped device may provide a location of the device with respect to, for example, a geographic coordinate system and/or geographic landmarks (e.g., streets, political entities, points of interest, etc.).

In today's world, people are concerned about the environmental impact of their activities. For example, people may be concerned about carbon emissions created by certain activities they perform. Some non-profit organizations provide drivers with the opportunity to participate in carbon offset programs. Drivers may purchase credits towards carbon offset programs to account for the carbon emissions created by the activities of the drivers (e.g., driving to/from work, traveling via their personal vehicle, planes, or trains, etc.). Carbon offset programs may create and/or provide funding for renewable energy sources (e.g., building new windmills and solar farms) and fund efforts to reduce carbon already in the atmosphere (e.g., planting new forests, donating to conservation funds, and funding research). Accordingly, carbon offset programs may lower the net carbon emissions of drivers without the drivers having to change their activities.

Some applications may benefit from providing rewards (e.g., carbon offset credits) to drivers in exchange for their personal data (e.g., telematics data, demographics data) associated with the drivers. Telematics data of drivers may be collected during a trip using devices (e.g., mobile devices) carried by drivers of their vehicles. In such applications, a driver may offer their personal data (e.g., telematics data, demographics data) to certain merchants via a marketplace in exchange for rewards, goods, or services, such as carbon offset credits or car insurance premium discounts. Currently available solutions do not provide such a platform between consumers and merchants.

BRIEF SUMMARY

The present embodiments may relate to, inter alia, systems and methods for providing a marketplace for users, such as customers, to share user data, including telematics data and demographics data, with a plurality of providers in exchange for compensation. In some embodiments of the present disclosure, users may share elements of their driving behavior, such as location data or telematics data, in combination with their demographics data, with providers in exchange for rewards including points towards a reward program, carbon offset credits, or even charitable contributions, among others. In some embodiments of the present disclosure, users may access the marketplace via a mobile device application.

In one aspect, a telematics data marketplace (TDM) computing device including at least one processor in communication with a memory device may be provided. The at least one processor may be configured to: (i) receive registration data from a provider of a plurality of providers, wherein the registration data includes desired user data sets and a purchase price associated with the desired user data sets, (ii) retrieve, from the memory device, user data associated with a plurality of users, wherein the user data includes at least telematics data associated with the plurality of users, (iii) match the provider to one or more users of the plurality of users based upon the user data associated with the users matching the desired user data sets of the provider, (iv) prompt the matched users to allow the provider access to the user data associated with the users for the purchase price, (v) transmit the user data of the matched users to the provider, and (vi) provide the matched users with a reward corresponding to the purchase price associated with the desired user data set. The TDM computing device may include additional, less, or alternate functionality, including that discussed elsewhere herein.

In another aspect, a computer-based method implemented using a telematics data marketplace (TDM) computing device may be provided. The TDM computing device may include at least one processor in communication with a memory device, and the method may include: (i) receiving registration data from a provider of a plurality of providers, wherein the registration data includes desired user data sets and a purchase price associated with the desired user data sets, (ii) retrieving, from the memory device, user data associated with a plurality of users, wherein the user data includes at least telematics data associated with the plurality of users, (iii) matching the provider to one or more users of the plurality of users based upon the user data associated with the users matching the desired user data sets of the provider, (iv) prompting the matched users to allow the provider access to the user data associated with the users for the purchase price, (v) transmitting the user data of the matched users to the provider, and (vi) providing the matched users with a reward corresponding to the purchase price associated with the desired user data set. The computer-based method may include additional, less, or alternate actions, including those discussed elsewhere herein.

In yet another aspect, at least one non-transitory computer-readable storage media having computer-executable instructions embodied thereon may be provided that, when executed by at least one processor in communication with a memory device, the computer-executable instructions may cause the processor to: (i) receive registration data from a provider of a plurality of providers, wherein the registration data includes desired user data sets and a purchase price associated with the desired user data sets, (ii) retrieve, from the memory device, user data associated with a plurality of users, wherein the user data includes at least telematics data associated with the plurality of users, (iii) match the provider to one or more users of the plurality of users based upon the user data associated with the users matching the desired user data sets of the provider, (iv) prompt the matched users to allow the provider access to the user data associated with the users for the purchase price, (v) transmit the user data of the matched users to the provider, and (vi) provide the matched users with a reward corresponding to the purchase price associated with the desired user data set. The computer-executable instructions may cause additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
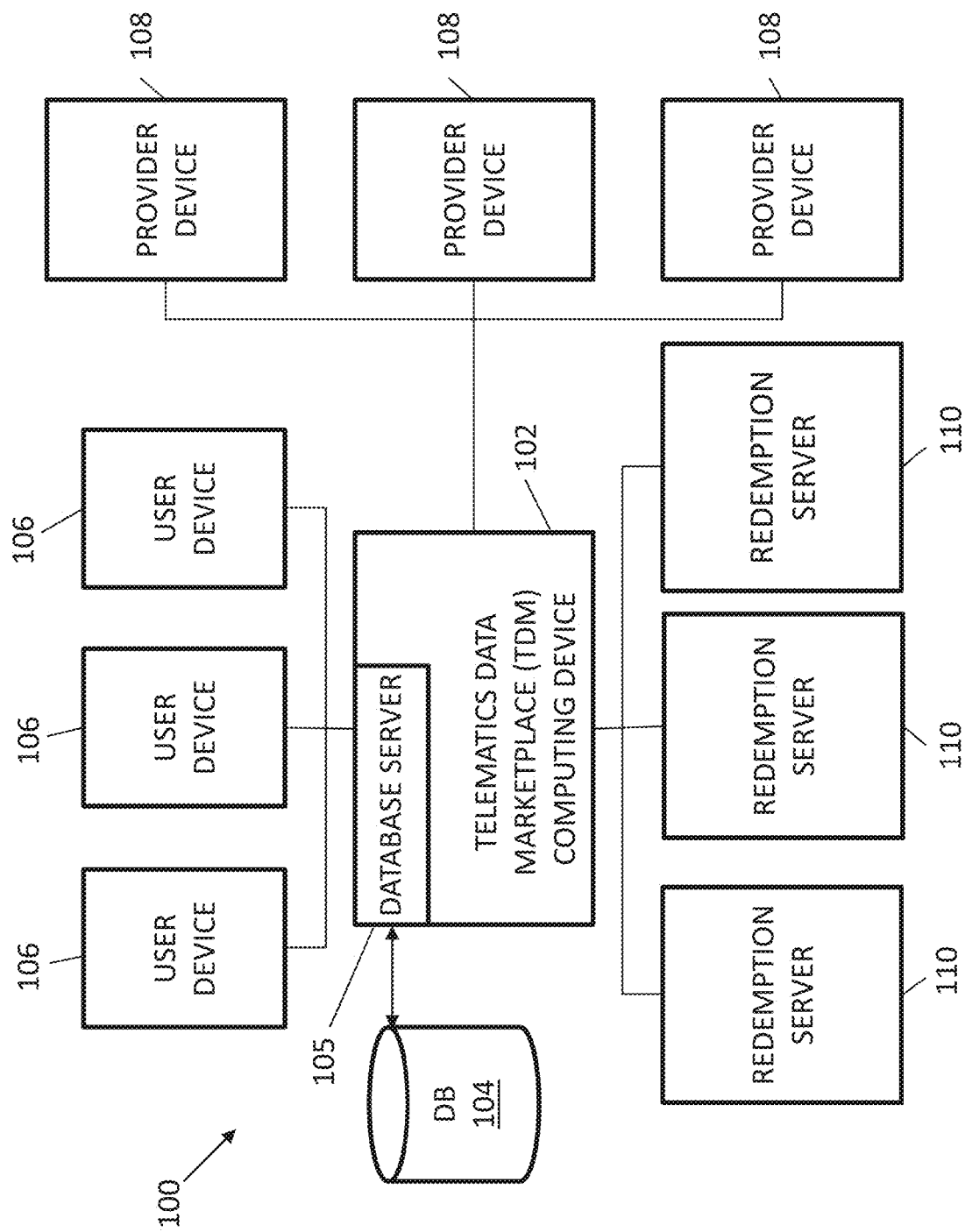
FIG. 1 depicts an exemplary telematics data marketplace (TDM) computing system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the embodiments described herein.

DETAILED DESCRIPTION OF THE DRAWINGS

The subject matter will now be descried in detail for specific preferred embodiments. It is understood that the described embodiments are intended only as illustrative examples and are not to be limited thereto.

The present embodiments may relate to, inter alia, systems and methods for providing a marketplace for users to share and provide user data associated with the users, such as telematics data and demographics data, in exchange for a reward. In the exemplary embodiment, user data may include telematics data associated with the users (e.g., as generated by user devices associated with the user using GPS, accelerometer, and gyroscope sensors of the user devices and/or telematics sensors included in or on a vehicle of the user) and demographic data of the users (e.g., age, location, gender, etc.). In some embodiments, the users may share or sell the user data in exchange for a reward and/or compensation. The reward may include user rewards points related to a rewards program, gift cards, cash (e.g., in the form of a direct deposit or check), discounted vehicle insurance premiums, carbon offset credits, charitable contributions, or the like. In some embodiments, the reward may be handled by one or redemption servers, such as an intermediary server between, for example, the marketplace and a rewards program or a bank. In at least one exemplary embodiment, the process may be performed and implemented by a telematics data marketplace (TDM) computing device described herein.

In some embodiments, the TDM computing device may include create a marketplace for providers to list desired user data sets and a purchase price associated with the desired user data sets. Desired user data sets, for example, may include GPS location-based data, telematics data, user demographics data (e.g., location, age, gender, etc.), or a combination thereof. Other data with respect to the user may be collected as well. Other user data collected may include, but is not limited to, age ranges, driving age (e.g., how long a driver has had their license), driver history (e.g., tickets, accidents), etc. In some embodiments, the accompanying purchase price may indicate at least one or more of user rewards points, gift cards, a cash amount, discounts on insurance premiums, carbon offset credits, charitable contributions, or the like. For example, a provider (e.g., an insurance company) may list, via the marketplace, that the provider is searching for all telematics data associated with users between the ages of 18 and 35 in major metropolitan areas and that the reward associated with allowing the provider access to the telematics data is 20% off an insurance plan through the provider, a reward redeemable through the marketplace worth $10, and/or carbon offset credits that account for offsetting 300 pounds of carbon in the atmosphere.

The TDM computing device may facilitate the sharing of user data through the marketplace. The user data may be collected by a user device associated with the user. For example, the user data may be collected by a mobile device associated with the user including GPS and accelerometer and gyroscope sensors. The user data may include telematics data regarding the driving characteristics, driving behaviors, and/or driving habits of the user (e.g., velocity, acceleration rates, turning events, braking events, defensive driving tendencies, aggressive driving behavior, average speed in relation to posted speed limits, quick acceleration, sharp cornering, and/or hard braking events). The TDM computing device may match users and their associated user data with providers based upon the desired data sets of the providers matching the user data. For example, the TDM computing device may match all users between the ages of 18 and 35 in major metropolitan areas with the provider requesting user data associated with those specific users.

Further, the TDM computing device may enable users to be selective of the providers with which the users share their user data. Users may specify which providers (e.g., based upon the services provided by the providers and/or the groups/classes to which the providers belong) may be allowed access to the user data. Additionally, users may specify a minimum reward and/or a specific reward type for which the users will share their user data with the providers. In some embodiments, these specifications may be included in the user data. For example, a user may specify that their user data may only be accessed by providers that will reward the user with carbon offset credits and/or allow the redemption servers to exchange the purchase price of the user data for carbon offset credits. Further, if the main interest of the user is using the marketplace rewards for environmental causes, the user may specify that any provider associated with fossil fuel and/or major carbon-producing industries does not have access to the user data.

Additionally or alternatively, the TDM computing device may provide the user with a listing of providers seeking to purchase the user data. That is, the TDM computing device may provide the user with a list of matched providers. The list may be transmitted to the user for their review (e.g., through a user interface of a user device associated with the user), and the TDM computing device may enable the user to allow or deny access to each of the purchasing entities. In some embodiments, the user may be prompted to allow or deny the providers access to the user data (e.g., through a "one-click" command). The user may also be prompted to selectively choose certain providers of the list that may be allowed access the user data and the providers of the list that should be denied access to the user data.

In some embodiments, the TDM computing device, through the marketplace, may enable users to become at least partially carbon neutral. For example, a user may agree to provide their user data to a provider as long as the provider purchases carbon offset credits on behalf of the user. In some embodiments, the user data may include a value of greenhouse gas emission and/or carbon dioxide output associated with the user. The providers may contribute carbon offset credits that lower the net values of greenhouse gas emissions and/or carbon dioxide outputs by the user in exchange for access to the user data. Accordingly, by allowing providers to access user data, users may lower their carbon footprints.

In some embodiments, the TDM computing device may additionally include (e.g., by being in communication with) one or more redemption servers leveraged to provide rewards or compensation. For example, one or more of the redemption servers may issue the reward owed to the user from the provider in exchange for access to the user data. In some embodiments, the providers may offer a purchasing price associated with the requested user data sets, and the redemption servers may convert the purchasing price to a reward for the matched user associated with the requested user data sets. The users may specify which type of reward the users prefer, and the redemption servers may convert the purchasing price to the preferred reward of each user. For example, a user may specify that the user prefers non-profit donations as their reward for allowing providers access to their user data. Accordingly, the redemption servers may convert the purchasing price from the providers into a non-profit donation in the name of the user. Further, for example, if the user does not specify which rewards the user prefers, the redemption servers may transmit a predetermined reward to the user (e.g., determined by the redemption server and/or the provider). The redemption servers may serve as an intermediary between the marketplace and an external server employed to provide compensation. An external server may include a non-profit organization that participates in the selling of carbon offset credits, a bank to issue payments either electronically or via a paper check, a rewards program the user may be a member of, or a charitable cause the user selects to have their owed compensation sent to. In alternative embodiments, the redemption server may be equipped to purchase carbon offsets. For example, carbon offsets may be purchased to cancel out greenhouse gas emissions. Compensation to purchase carbon offsets may be paid towards renewable energy programs, or other types of carbon offset programs. In some embodiments, carbon offset programs may be non-profit organizations.

As described below, the TDM computing device described herein may create a marketplace for the exchange of user data (e.g., GPS data, telematics data, and/or demographic data) for compensation or rewards from a provider. As used herein, "user" refers to any type of consumer, customer, or driver participating in the marketplace system as a provider of data for sale, and "provider" refers to a participating entity of the marketplace system intending to receive the user data by offering some form of compensation to the user for the user data.

At least one of the technical problems addressed by this system may include: (i) inability to leverage user data (e.g., GPS-data or telematics data) of users through a marketplace, (ii) inability of users to exchange user data for one or more different types of compensation (e.g., user rewards points, cash compensation, carbon offset credits, charitable contributions, or the like), (iii) inability of users to control access to user data, (iv) inability of purchasing entities of user data to specify which user data the purchasing entity wishes to receive, and (v) inability to automatically match users and associated user data with specifications of user data requested by purchasing entities.

A technical effect of the systems and processes described herein may be achieved by performing at least one of the following steps: (i) receiving registration data from a provider of a plurality of providers, wherein the registration data includes desired user data sets and a purchase price associated with the desired user data sets, (ii) retrieving, from the memory device, user data associated with a plurality of users, wherein the user data includes at least telematics data associated with the plurality of users, (iii) matching the provider to one or more users of the plurality of users based upon the user data associated with the users matching the desired user data sets of the provider, (iv) prompting the matched users to allow the provider access to the user data associated with the users for the purchase price, (v) transmitting the user data of the matched users to the provider, and (vi) providing the matched users with a reward corresponding to the purchase price associated with the desired user data set. The technical effect may be achieved by performing additional, less, or alternate steps, including those discussed elsewhere herein.

The systems and processes described herein may provide the following technical solutions: (i) providing a marketplace for leveraging user data; (ii) allowing users to exchange user data for one or more different types of compensation (e.g., user rewards points, cash compensation, carbon offset credits, charitable contributions, or the like), (iii) allowing users to control access to the user data, (iv) allowing purchasing entities of user data to specify which user data the purchasing entity wishes to receive, and (v) automatically matching users and associated user data with specification of user data requested by purchasing entities. Accordingly, the systems and processes described herein may allow users to have control over which purchasing entities have access to the user data, and users may receive compensation in exchange for the user data. Further, purchasing entities of user data may specify which user data the purchasing entities wish to receive. Since the systems and methods allow the purchasing entities to reward users for allowing the purchasing entities access to the user data, the purchasing entities may attract more users and therefore may receive more user data.

Exemplary Computer System for Providing a Marketplace

FIG. 1 depicts an exemplary telematics data marketplace (TDM) system 100. TDM system 100 may include a TDM computing device 102. TDM computing device 102 may include a database server 105 that may be communicatively coupled to a database 104 that stores data. In one embodiment, database 104 may be a local storage device. In another embodiment, database 104 may be a remote storage device, such as cloud storage, or the like. TDM computing device 102 may be in communication with a plurality of user devices 106. TDM computing device 102 may also be in communication with a plurality of provider devices 108. Further, TDM computing device 102 may be in communication with a plurality of redemption servers 110. In some embodiments, redemption servers 110 may be associated with, for example, an insurer providing a usage-based insurance policy to users associated with user devices 106. In some embodiments, these individuals may receive insurance premium discounts in exchange for user data (e.g., as collected by user devices 106), based upon an agreement with one or more of the providers 108.

In the exemplary embodiment, user devices 106 may be computers that include a web browser or a software application, user devices 106 to access remote computer devices, such as TDM computing device 102, using the Internet or other network. More specifically, user devices 106 may be communicatively coupled to TDM computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User devices 106 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. User devices 106 may include GPS sensors, accelerometers, and gyroscope, as described herein. TDM computing device 102 may receive user data (e.g., geographic coordinate data, time measurement data, and/or telematics data) from user devices 106. Further, TDM computing device 102 may securely store the collected user data on database 104.

In the exemplary embodiment, provider devices 108 may be computers that include a web browser or a software application, which enables provider devices 108 to access remote computer devices, such as TDM computing device 102, using the Internet or other network. More specifically, provider devices may be communicatively coupled to TDM computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Provider devices 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Redemption servers 110 may be communicatively coupled with TDM computing device 102. In some embodiments, redemption servers 110 may serve as an intermediary between TDM computing device 102 and a third-party server (not shown), and redemption servers 110 may be employed to provide compensation to users (e.g., associated with user devices 106). More specifically, redemption servers 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

TDM computing device 102 may receive offers from provider devices 108. The received offers may detail a list of desired user data. In some embodiments, the received offers may include an accompanying purchase price. The purchase price may be in the form of a rewards points credit, a cash amount, a gift card, a charitable contribution amount, a carbon offset credit amount, or the like. Received offers may specify certain characteristics of data being sought. For example, in one embodiment, providers associated with provider devices 108 may only be interested in GPS location-based data of a pool of users in exchange for a cash reward. Accordingly, the providers, through provider devices 108, may specify for their listing: 1) location-based data, 2) amount of users, and 3) cash reward. In another example, providers associated with provider devices 108 may be interested in GPS location-based data and time measurement data (e.g., how long a user spends at certain locations, such as shopping venues) in exchange for a carbon offset credit. Accordingly, the providers, through provider devices 108, may specify for their listing: 1) location-based data and time measurement data, 2) amount of users, and 3) carbon offset credit as a reward.

TDM computing device 102 may coordinate with redemption servers 110 such that provider devices 108 may fulfill compensation rewards agreed upon between certain users (e.g., associated with user devices 106) and providers (e.g., associated with provider devices 108). For example providers associated with provider devices 108 may propose an offer for a user's GPS position data in exchange for a cash reward. The providers, through provider devices 108, may then utilize redemption servers 110 to facilitate payment. For example, the providers, through provider devices 108 may transmit a payment to redemption server 110, and redemption server 110 may then prepare a check to be transmitted to one or more users (e.g., associated with user devices 106). In some embodiments, redemption servers 110 may facilitate any type of reward or payment (e.g., cash payment, check payment, digital currency payment, rewarding reward points, providing merchant gift cards, providing offers and/or discounts on behalf of providers, buying carbon offset credits, etc.).

TDM computing device 102 may broker an agreement between a user associated with user device 106 and a provider associated with provider device 108. For example, the user may agree to provide the provider access to the user data of the user in exchange for carbon offset credits. Accordingly, redemption servers 110 may either be associated with and/or be able to facilitate communication with a carbon offset non-profit organization that offers the ability to buy carbon offset credits. Once the provider receives the desired user data, the provider may send funds, through provider device 108, to redemption servers 110 either directly or via TDM computing device 102. In some embodiments, a user may be given the option, via user device 106, to choose from a listing of different carbon offset programs. Once chosen, carbon offset credits may be sent to the carbon offset program as specified by the user.

TDM computing device 102 may broker a deal between a user, associated with user device 106 and a provider, associated with provider device 108, and the provider may offer reduced vehicle insurance premiums as a reward for access to user data. Accordingly, a vehicle insurance company may be associated with redemption servers 110 such that the user may receive the reduced vehicle insurance premium in exchange for providing the vehicle insurance company with the user data.

TDM computing device 102 may also restrict access to user data for certain providers. For example, a user may specify that certain providers should not be permitted to purchase user data of the user. Accordingly, TDM computing device 102 may restrict the providers from accessing the user data. Additionally, or alternatively, a user may grant or deny access to one or more providers through user device 106. For example, the user may be provided with a listing of matched providers (e.g., through a user interface of user device 106). TDM computing device 102 may prompt the user to allow or deny access to the user data (e.g., using "one-click") for each of the providers of the list.

Exemplary User Device

Figure 2:
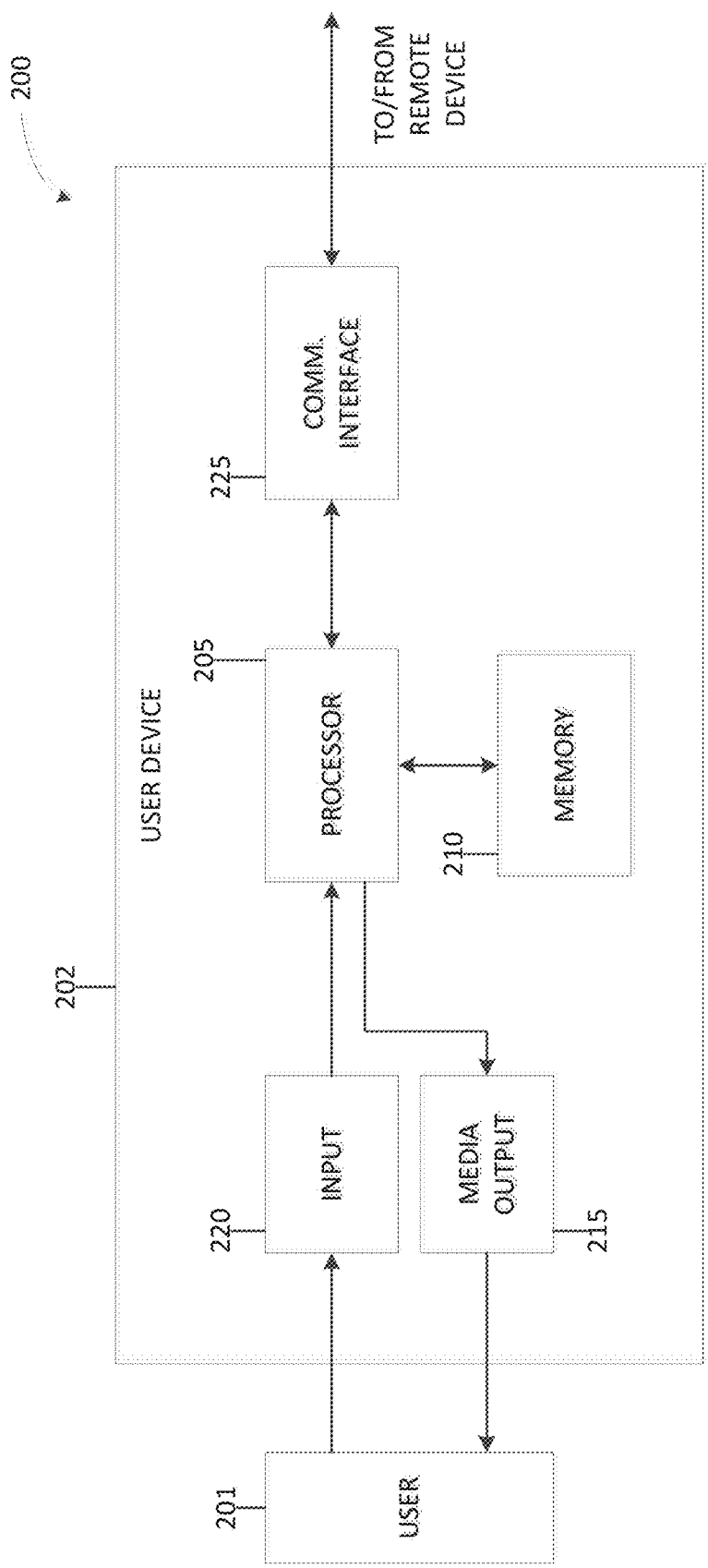
FIG. 2 depicts an exemplary client computing device that may be used with the TDM computing system shown in FIG. 1.

FIG. 2 depicts an exemplary configuration 200 of a user computer device 202, in accordance with one embodiment of the present disclosure. User device 202 may be operated by a user 201. User device 202 may include, but is not limited to, user devices 106 and/or provider devices 108 (shown in FIG. 1). User device 202 may include a processor 205 for executing instructions. In some embodiments, executable instructions may be stored in a memory 210. Processor 205 may include one or more processing units (e.g., in a multi-core configuration). Memory 210 may be any device allowing information such as executable instructions and/or transaction data to be stored and retrieved. Memory 210 may include one or more computer readable media.

User device 202 may also include at least one media output component 215 for presenting information to user 201. Media output component 215 may be any component capable of conveying information to user 201. In some embodiments, media output component 215 may include an output adapter (not shown) such as a video adapter and/or an audio adapter. An output adapter may be operatively coupled to processor 205 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 215 may be configured to present a graphical user interface (e.g., a web browser and/or a client application) to user 201. In some embodiments, user device 202 may include an input device 220 for receiving input from user 201. User 201 may use input device 220 to, without limitation, provide user data and specifications to TDM computing device 102 (shown in FIG. 1), allow providers to access user data, deny providers access to user data, and receive and/or interact with the reward for allowing one or more providers access to the user data.

Input device 220 may include, for example, a keyboard, a pointing device, a mouse, a stylus, a touch sensitive panel (e.g., a touch pad or a touch screen), a gyroscope, an accelerometer, a position detector (e.g., a GPS sensor), a biometric input device, and/or an audio input device. A single component such as a touch screen may function as both an output device of media output component 215 and input device 220.

User device 202 may also include a communication interface 225, communicatively coupled to a remote device such as TDM computing device 102 (shown in FIG. 1). Communication interface 225 may include, for example, a wired or wireless network adapter and/or a wireless data transceiver for use with a mobile telecommunications network.

Stored in memory 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website from TDM computing device 102. A client application (e.g., an application associated with TDM computing device) may allow user 201 to interact with, for example, TDM computing device 102. For example, instructions may be stored by a cloud service, and the output of the execution of the instructions sent to the media output component 215.

Exemplary Computer System for Receiving Telematics Data

Figure 3:
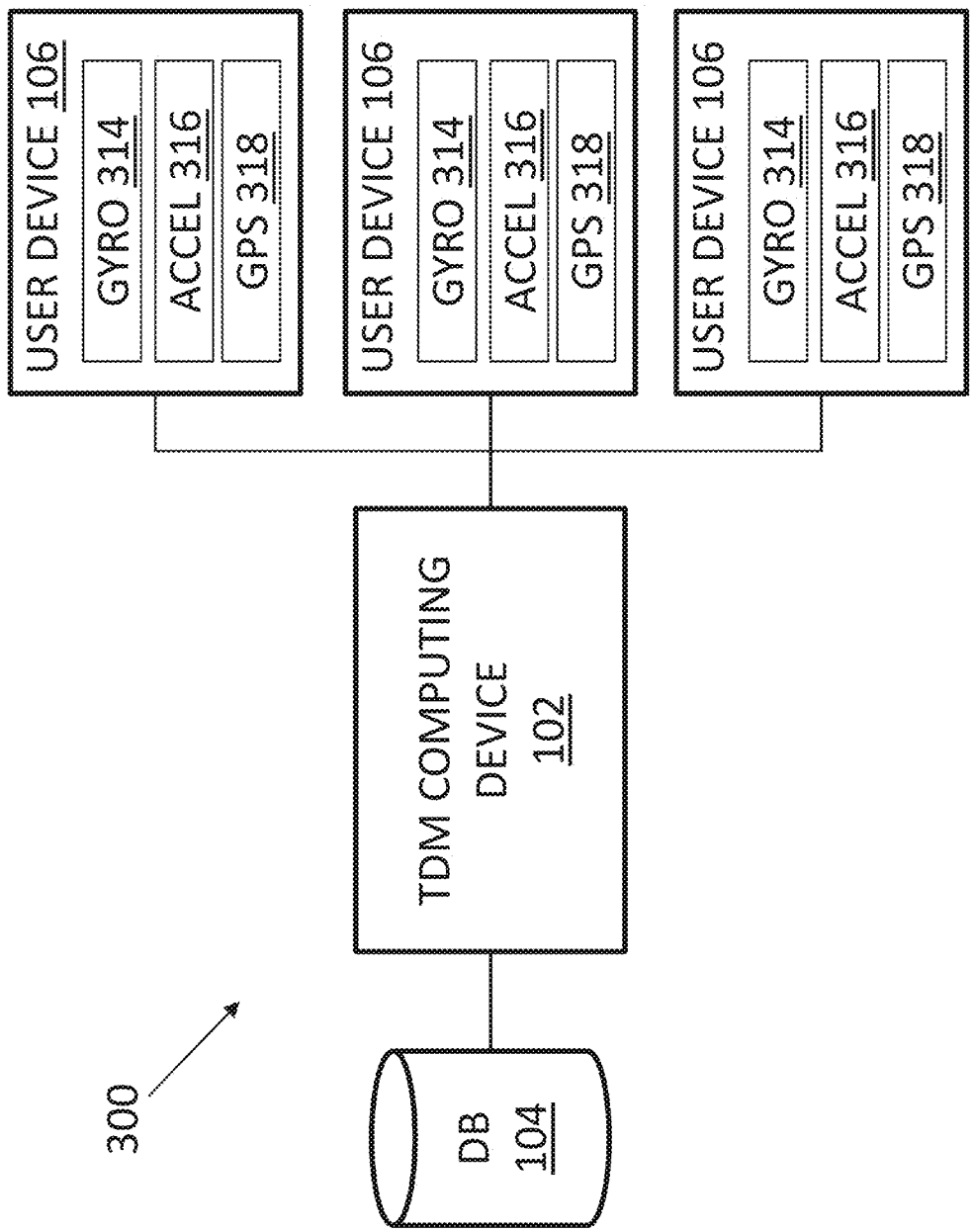
FIG. 3 depicts an exemplary network configuration in accordance with an exemplary embodiment of the present disclosure.

FIG. 3 depicts an exemplary network configuration in accordance with an exemplary embodiment of the present disclosure. As illustrated in FIG. 3, in various configurations 300, the TDM computing device 102 may receive geographic coordinate data, time measurement data, and/or telematics data from user devices 106 and/or other sensors (e.g., telematics sensors coupled to and/or in communication with a vehicle of the users). User devices 106 may include components for capturing and generating data, such as a GPS device 318, an accelerometer 316, a gyroscope 314, and/or any other device capable of capturing data. TDM computing device 102 may store the received geographic coordinate data and telematics data to a secure location, such as database 104. In some embodiments, database 104 may be a local storage device. Alternatively, database 104 may be a remote storage location, such as on a cloud storage device.

User devices 106 may be equipped with, for example, GPS devices 318. GPS devices 318 may utilize GPS techniques to determine a measurement of geographic coordinates of the corresponding user device 106. The GPS device 318 may also provide real-time and historic navigation data. Because some factors (e.g., atmospheric effects) may reduce the precision of GPS devices 318, GPS devices 318 may return, for example, an error estimate along with the measured geographic location. The measured geographic location and error estimate may provide an area (e.g., a radius around the measured geographic location) where the corresponding user device 106 may be located with a probability above a threshold probability.

User devices 106 may also be equipped with, for example, accelerometers 316. Accelerometers 316 may be capable of measuring a linear and/or angular acceleration of the corresponding user device 106 at a given moment in time. User devices 106 may also be equipped with, for example, gyroscopes 314. Gyroscopes 314 may be capable of determining an orientation of user devices 106. Accordingly, accelerometers 316 and gyroscopes 314 together may be used to determine a direction of acceleration of the respective user device 106. Data generated by GPS devices 318, accelerometers 316, and/or gyroscopes 314 may be used (e.g., by TDM computing device 102 and/or user devices 106) to generate telematics data (e.g., a location, orientation, acceleration, velocity, etc.) of the corresponding user device 106. Such telematics data may be provided to providers (e.g., associated with provider devices 108, shown in FIG. 1) by TDM computing device 102, for example, in exchange for a reward to users associated with user devices 106, as described herein.

In some exemplary embodiments, TDM computing device 102 may be used to implement a usage-based insurance platform. In a usage-based insurance policy, an insurance premium corresponds to a driver's actual driving behavior. For example, the insurance premium may be based in part upon telematics data collected from a user device associated with the driver.

Exemplary Server System

Figure 4:
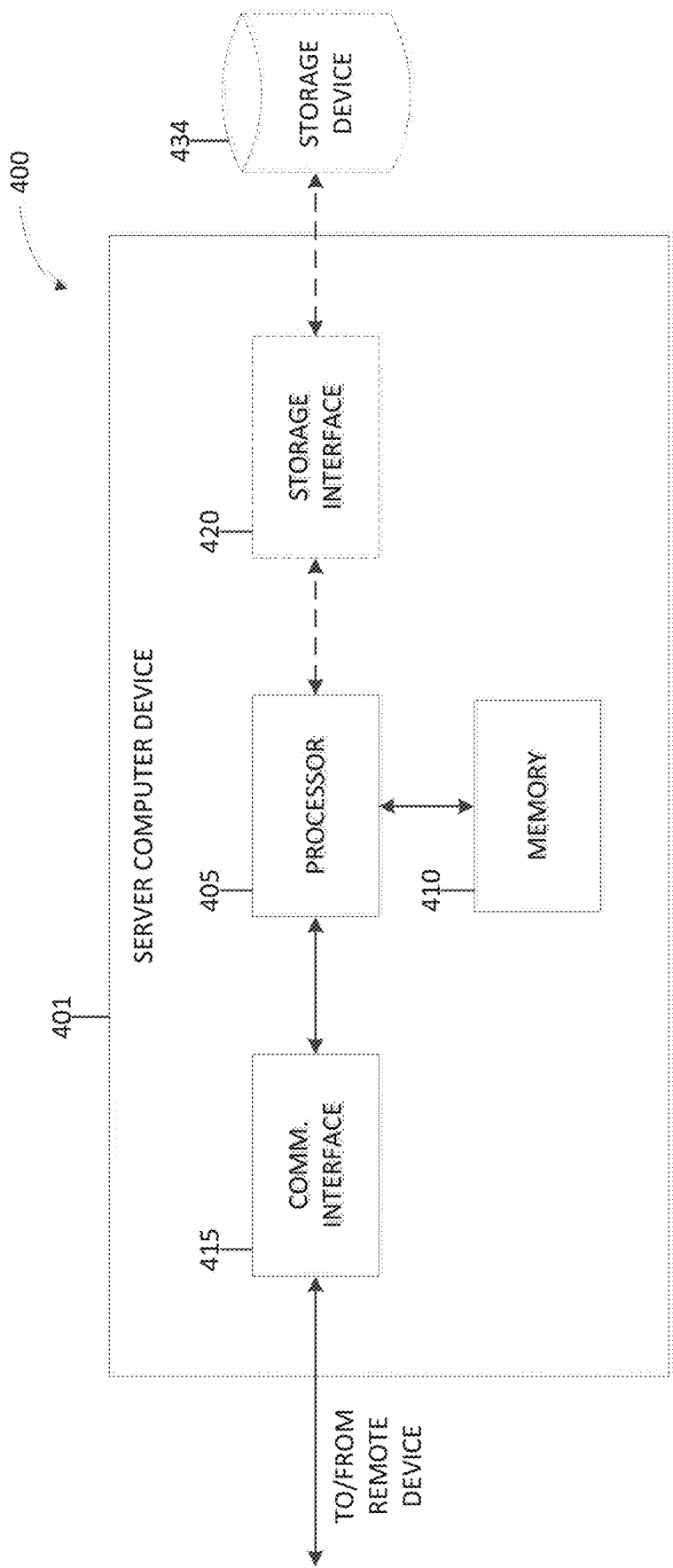
FIG. 4 depicts an exemplary server computing device that may be used with the TDM computing system illustrated in FIG. 1.

FIG. 4 depicts an exemplary configuration of server system 400, in accordance with one embodiment of the present disclosure. Server computer device 401 may include, but is not limited to, TDM computing device 102, database server 105, and/or redemption servers 110 (all shown in FIG. 1). Server computer device 401 may also include a processor 405 for executing instructions. Instructions may be stored in a memory 410. Processor 405 may include one or more processing units (e.g., in a multi-core configuration).

Processor 405 may be operatively coupled to a communication interface 415 such that server computer device 401 is capable of communicating with a remote device such as another server computer device 401, TDM computing device 102, and/or redemption server 110. For example, communication interface 415 may receive input from user device 106 via the Internet, as illustrated in FIG. 1.

Processor 405 may also be operatively coupled to a storage device 434. Storage device 434 may be any computer-operated hardware suitable for storing and/or retrieving data, such as, but not limited to, data associated with database 106 (shown in FIG. 1). In some embodiments, storage device 434 may be integrated in server computer device 401. For example, server computer device 401 may include one or more hard disk drives as storage device 434.

In other embodiments, storage device 434 may be external to server computer device 401 and may be accessed by a plurality of server computer devices 401. For example, storage device 434 may include a storage area network (SAN), a network attached storage (NAS) system, and/or multiple storage units such as hard disks and/or solid-state disks in a redundant array of inexpensive disks (RAID) configuration.

In some embodiments, processor 405 may be operatively coupled to storage device 434 via a storage interface 420. Storage interface 420 may be any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 may execute computer-executable instructions for implementing aspects of the disclosure. In some embodiments, the processor 405 may be transformed into a special purpose microprocessor by executing computer-executable instructions or by otherwise being programmed. For example, the processor 405 may be programmed with the instruction such as illustrated in FIGS. 5 and 6.

Exemplary Method for Creating a Telematics Data Marketplace

Figure 5:
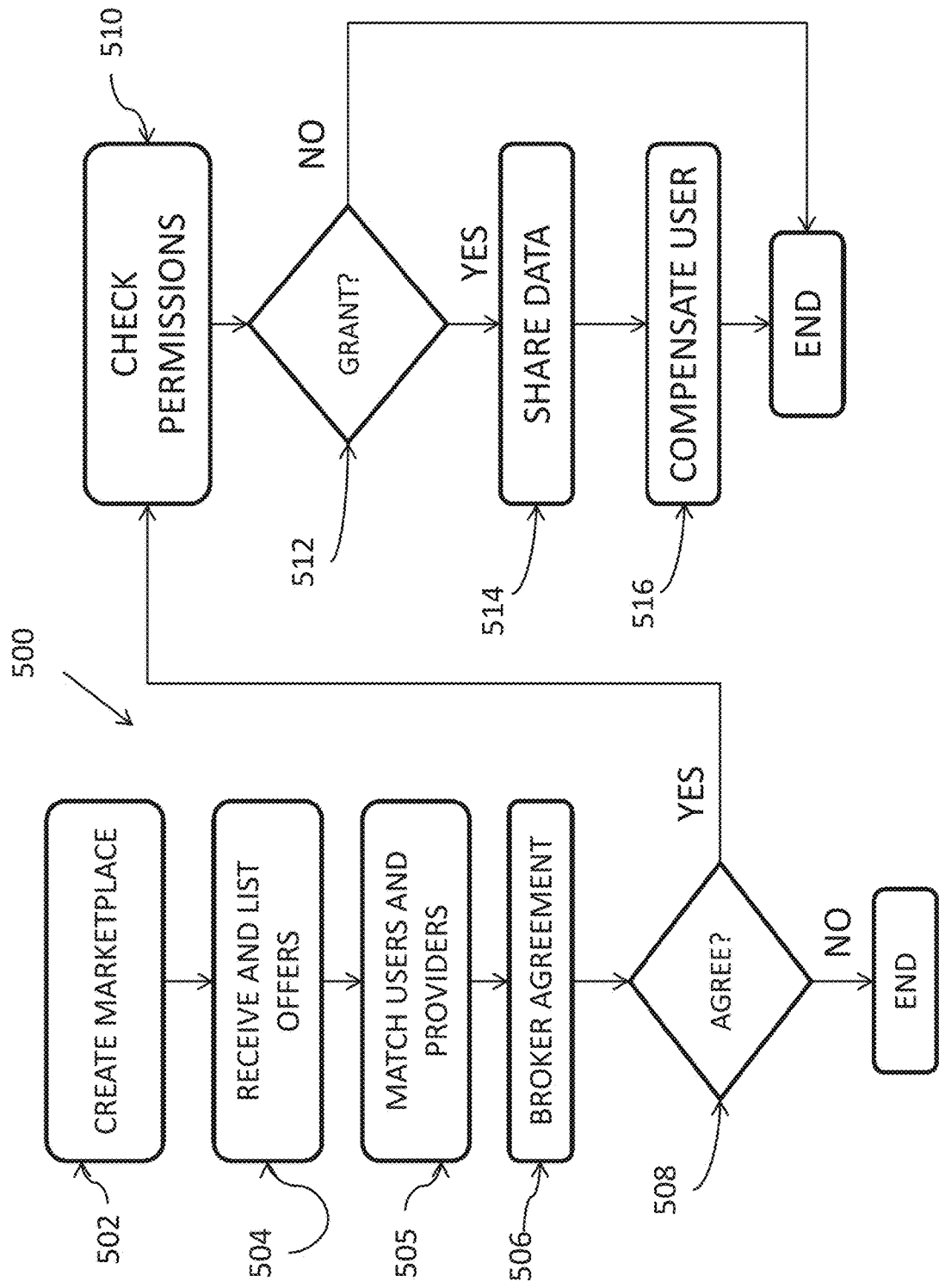
FIG. 5 depicts an exemplary process implemented by TDM computing system for creating a marketplace in accordance with an exemplary embodiment of the present disclosure.
Figure 6:
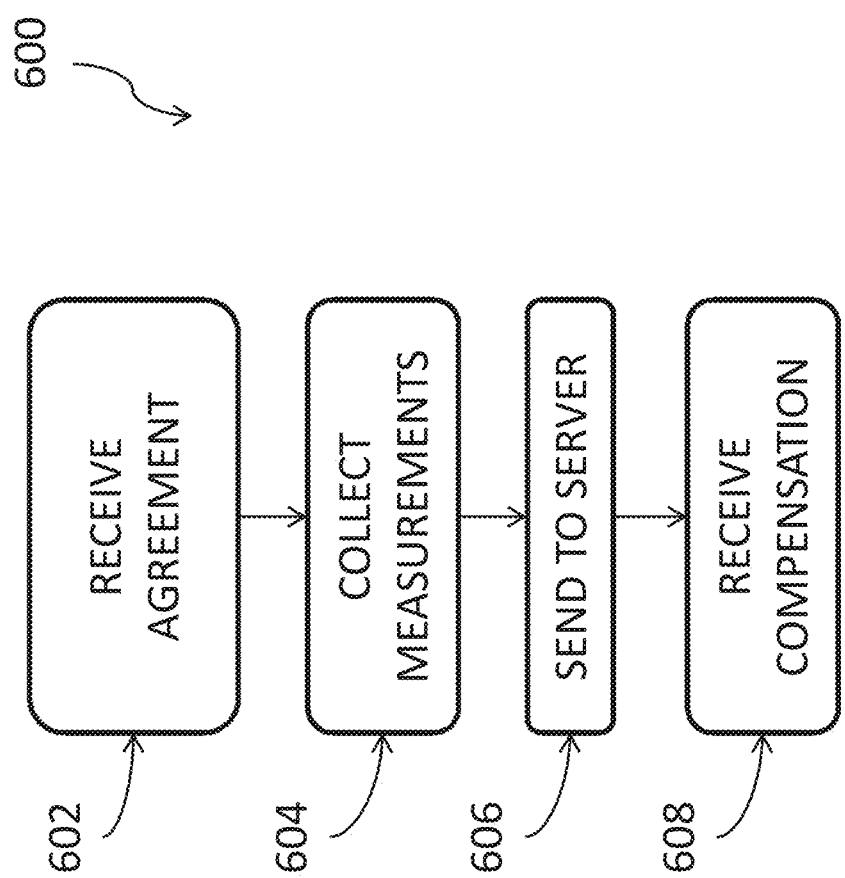
FIG. 6 depicts an exemplary process implemented by one or more client computing devices for user data collection in accordance with an exemplary embodiment of the present disclosure.

FIG. 5 depicts an exemplary method 500 for creating a telematics data marketplace, listing one or more offers from a plurality of providers, enabling a plurality of customers, or users, to agree to provide user data in exchange for some form of compensation, and facilitating transmitting compensation from the plurality of providers in exchange for the access to user data in response to the specified agreement. Method 500 may be performed by TDM computing device 102 (shown in FIG. 1). Further, steps of method 500 may be performed in conjunction with one or more user devices 106, provider devices 108, and redemption servers 110, as shown in the exemplary configuration illustrated in FIG. 1.

Method 500 may include creating 502, a marketplace, by a computing device such as TDM computing device 102. The marketplace, in some embodiments, may be hosted by TDM computing device 102, and the elements and components of the marketplace may be stored on a storage device, such as database 104 (shown in FIG. 1). The marketplace may be made accessible via a network, such as the Internet. In some embodiments, the marketplace may be accessible to a certain group of users, such as via a private network. The marketplace may be made accessible to a plurality of users via one or more client devices, a plurality of providers, and a plurality of redemption servers, for example.

In some embodiments, the marketplace may be accessible via a mobile device application. A mobile device application may be made available to a user on a user device 106 associated with the user. Further, the application may be hosted by and/or in communication with TDM computing device 102. Alternatively, the marketplace may be accessible via a desktop application, a web-based interface, or the like.

Method 500 may include receiving and listing 504 offers from a plurality of different providers. The providers may send offers to the marketplace, and the offers may include different specifications, such as what type of user data is desired, how many users are authorized to agree to the offer, and what type of compensation will be offered to the user in exchange for their data. For example, some providers may only be interested in certain location-based data of users, such as a provider that is performing market research. In another embodiment, a provider may only desire telematics data with respect to user driving behavior (e.g., defensive driving behavior vs. aggressive driving behavior). In yet another embodiment, a provider may want to limit how many users may elect to accept the offer. Such a limit may be in response to allocated funds or other limitations. Further, a provider may specify what type of compensation is to be offered. The marketplace is enabled to allow different types of compensation, such as financial compensation in the form of a gift card, digital cash payment, or check payment, carbon offset credits, charitable contributions, or even access to discount programs. An exemplary discount program may be an insurance discount program whereby a user may benefit from a reduced insurance premium for sharing their user data.

Method 500 may include matching 505 users and providers based upon the desired user data types requested by the providers. That is, method 500 may include matching 505 users and their associated user data with providers based upon the desired data sets of the providers matching the user data. For example, a provider may request user data from users between the ages of 40 and 50 in rural areas. TDM computing device 102 may then search for user data (e.g., through querying database 104, shown in FIG. 1) that meets the needs of the provider. Method 500 may include matching 505 any users that match the desired user data sets of any providers. Accordingly, many users may be matched 505 with many providers.

After users and providers are matched 505, method 500 may include brokering 506 an agreement between at least one user and a provider (e.g., by displaying terms and conditions for exchanging access to user data for a reward on both user device 106 and provider device 108, shown in FIG. 1). If either the user or the provider does not agree to the terms and conditions, the process may end. In this example, the user may be taken back to a listing of offers from one or more other providers. If both the user and the provider do indeed agree 508 to the terms specified, the method 500 would continue. During the brokering phase, the user may be given the opportunity to read and review all terms and conditions of the agreement, for example.

Method 500 may include checking 510 permissions of the provider in view of certain settings made by a user with respect to their user data. For example, a user may specify certain providers that should not be granted access to the user data of the user. In another embodiment, a user may be provided a listing of prospective providers seeking to purchase the user data. The user may then, such as via user device 106, select which providers should be granted access and which providers should be denied access. For example, a user may perform a one-click operation (e.g., by allowing all matched providers access to the user data and/or by denying all matched providers access to the user data). As set forth in decision block 512, if the provider is granted access, method 500 continues. If access is denied, method 500 ends, and the provider is not permitted to purchase or view the user data.

Method 500 may include sharing 514 of data between the at least one agreeing user with the provider. The sharing of data may be performed, in one example, via TDM computing device 102. TDM computing device 102 may then be able to track what data is actually shared and ensure the brokered 506 agreement is being complied with.

Method 500 may include compensating 516 the user in line with the agreed upon terms. For example, the provider may transmit the compensation via TDM computing device 102. TDM computing device 102 may then transmit the compensation to the user directly or via one or more redemption servers 110 (shown in FIG. 1). For example, redemption server 110 may provide means for facilitating cash or check payment. In another embodiment, redemption server 110 may be enabled to facilitate carbon offset via one or more carbon credits programs. In yet another embodiment, redemption server 110 may facilitate an insurance premium discount for the user.

Exemplary Method for Collected Telematics Data

FIG. 6 depicts an exemplary method 600 for receiving brokered agreement details and collecting the needed measurements to be shared as user data with a provider for compensation. Method 600 may be performed by one or more of user devices 106, shown in FIG. 1.

Method 600 may include receiving 602, by user device 106, the details of an agreement. In at least one embodiment, the details would specify what type of user data is needed to comply with the agreement. For example, in one instance, only GPS location-based data may be needed. In another instance, telematics data with respect to velocity and braking events may be needed to comply with the agreement. Once the details are established, one or more components of the user device 106 may perform collecting 604 a plurality of measurements. In one embodiment, measurements may be collected 604 by a GPS device of user device 106. In another embodiment, telematics data may be collected by a combination of components or sensors, such as a GPS device, an accelerometer, and a gyroscope. In some embodiments, data pertaining to multiple trips of a user may be collected. For example, an agreement may specify that the user must travel to a certain number of locations, a certain distance, or a combination thereof.

Method 600 may include sending 606 collected user data to TDM computing device 102, shown in FIG. 1. TDM computing device 102 may then receive and store the collected user data on a storage device, such as database 104 (shown in FIG. 1). The received user data may then be stored for later processing. In another embodiment, user data may be stored in a cache for quick retrieval. Once processed by TDM computing device 102, the user data and measurements may be sent to at least one of the providers in accordance with the agreement.

Method 600 may include receiving 608 compensation in accordance with the agreed upon terms. In some embodiments, compensation may be received in the form of a digital cash payment, a paper check, or the like, as described herein. In other embodiments, a receipt may be issued to the user indicating a payment or credit was made on their behalf. For example, a user may receive a charitable contributions receipt for tax purposes. In another embodiment, a user may receive a carbon credits receipt indicating that they have successfully offset their carbon footprint. In other embodiments, a user may receive compensation in the form of a discounted premium on insurance. For example, a user may notice on their insurance premium bill a discount on their premium. It is understood that the forms of compensation described herein are meant to be illustrative and not meant to be limiting in any way.

Exemplary Computer Device

Figure 7:
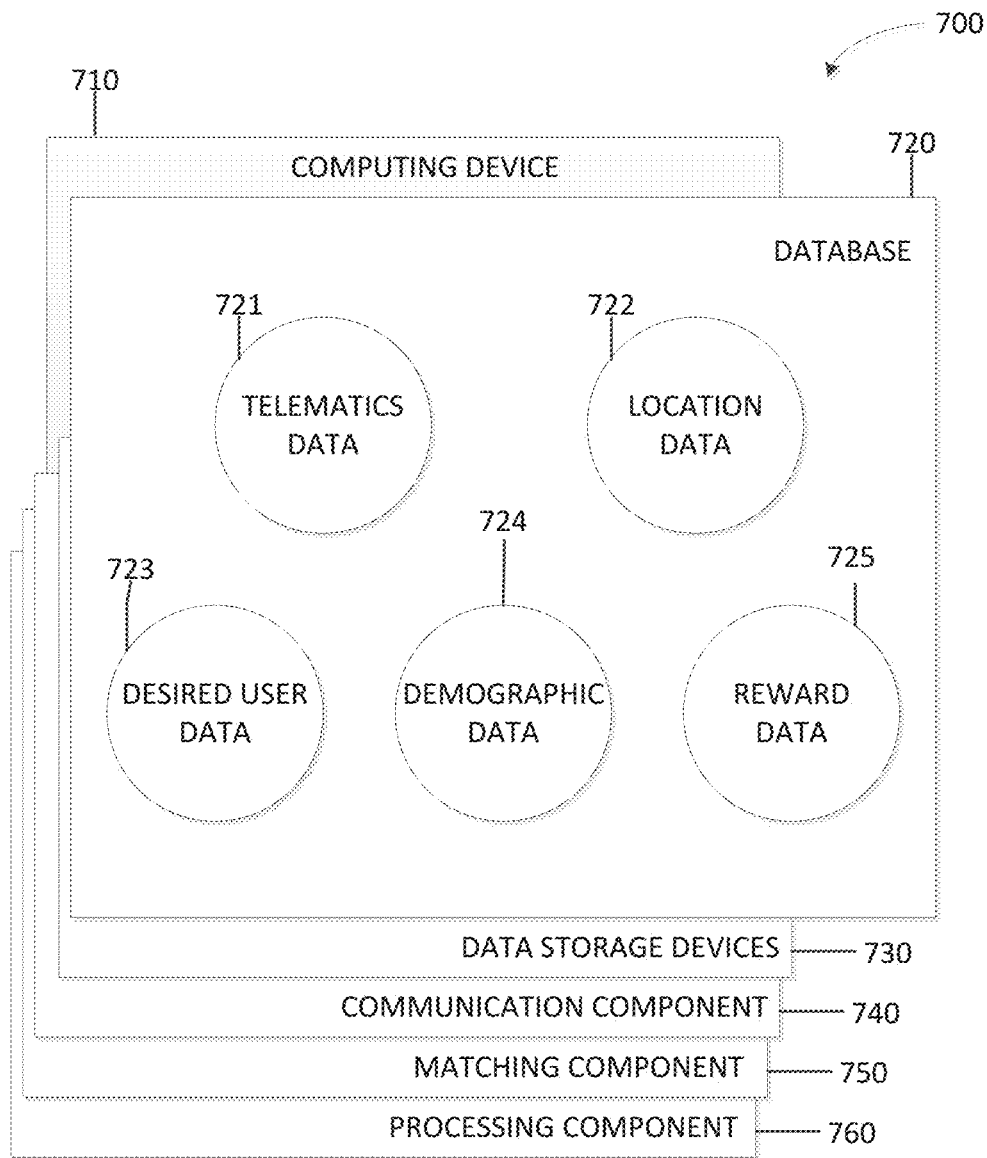
FIG. 7 illustrates a diagram of components of one or more exemplary computing devices that may be used in the TDM computing system shown in FIG. 1.

FIG. 7 depicts a diagram 700 of components of one or more exemplary computing devices 710 that may be used in computing system 100 shown in FIG. 1 and to implement method 500 shown in FIG. 5. In some embodiments, computing device 710 may be similar to TDM computing device 102 (shown in FIG. 1). Database 720 may be coupled with several separate components within computing device 710, which perform specific tasks. In this embodiment, database 720 may include telematics data 721 (e.g., including location data and vehicle usage data of a user), location data 722 (e.g., GPS data), desired user data 723 (e.g., from providers), demographic data 724, and reward data 725. In some embodiments, database 720 is similar to database 104 (shown in FIG. 1).

Computing device 710 may include the database 720, as well as data storage devices 730. Computing device 710 may also include a communication component 740 for communicating with different devices (e.g., user devices 106 and provider devices 108, shown in FIG. 1). Computing device 710 may further include a matching component 750 for matching providers and users based upon the desired user data sets of the providers. Moreover, computing device 710 may include a processing component 760 for processing, for example, telematics data, rewards, and user input.

Exemplary Embodiments

In one embodiment, a telematics data marketplace (TDM) computing device including at least one processor in communication with a memory device may be provided. The at least one processor may be configured to: (i) receive registration data from a provider of a plurality of providers, wherein the registration data includes desired user data sets and a purchase price associated with the desired user data sets, (ii) retrieve, from the memory device, user data associated with a plurality of users, wherein the user data includes at least telematics data associated with the plurality of users, (iii) match the provider to one or more users of the plurality of users based upon the user data associated with the users matching the desired user data sets of the provider, (iv) prompt the matched users to allow the provider access to the user data associated with the users for the purchase price, (v) transmit the user data of the matched users to the provider, and (vi) provide the matched users with a reward corresponding to the purchase price associated with the desired user data set. The TDM computing device may include additional, less, or alternate functionality, including that discussed elsewhere herein.

For example, a further enhancement of the TDM computing device may include the at least one processor being configured to: (i) creating a telematics data marketplace for the plurality of providers and the plurality of users, wherein the telematics data marketplace includes an application and (ii) allow the plurality of providers and the plurality of users to access the telematics data marketplace through user devices associated with the plurality of providers and the plurality of users.

Further, the reward provided to the matched users is at least one of rewards points, carbon offset credits, digital cash payment, electronic check payment, paper check payment, and a charitable contribution amount, and the at least one processor may further be configured to prompt the plurality of users to choose a preferred type of reward. The plurality of providers may include at least one of insurance companies, merchants, financial companies, municipal governments, and third-party data acquirers, and wherein the registration data further include a desired type of data set and a desired amount of users from which to receive the desired type of data. The user data may further include at least one of GPS location data and demographics data, and the desired user data sets may be collected by one or more sensors of user devices associated with the users. The one or more sensors may include a GPS sensor, an accelerometer, and a gyroscope.

Additionally, the at least one processor may further be configured to: (i) transmit a prompt to the matched users that the provider wishes to access the user data of the matched users, wherein the prompt includes a one-click option for the matched users to one of allow and deny access to the provider, (ii) receive a response to the prompt from the matched users, (iii) in response to the matched users allowing access to the user data to the provider, transmit the user data of the matched users to the provider, and (iv) in response to the matched users denying access to the user data to the provider, restrict access to the user data for the provider.

In another embodiment, a computer-based method may be provided. The computer-based method may be implemented by a telematics data marketplace (TDM) computing device including at least one processor in communication with a memory device, and the method may include: (i) receiving registration data from a provider of a plurality of providers, wherein the registration data includes desired user data sets and a purchase price associated with the desired user data sets, (ii) retrieving, from the memory device, user data associated with a plurality of users, wherein the user data includes at least telematics data associated with the plurality of users, (iii) matching the provider to one or more users of the plurality of users based upon the user data associated with the users matching the desired user data sets of the provider, (iv) prompting the matched users to allow the provider access to the user data associated with the users for the purchase price, (v) transmitting the user data of the matched users to the provider, and (vi) providing the matched users with a reward corresponding to the purchase price associated with the desired user data set. The computer-based method may include additional, less, or alternate functionality, including that discussed elsewhere herein.

In yet another embodiment, at least one non-transitory computer-readable storage media having computer-executable instructions embodied thereon may be provided that, when executed by at least one processor in communication with a memory device, the computer-executable instructions may cause the processor to: (i) receive registration data from a provider of a plurality of providers, wherein the registration data includes desired user data sets and a purchase price associated with the desired user data sets, (ii) retrieve, from the memory device, user data associated with a plurality of users, wherein the user data includes at least telematics data associated with the plurality of users, (iii) match the provider to one or more users of the plurality of users based upon the user data associated with the users matching the desired user data sets of the provider, (iv) prompt the matched users to allow the provider access to the user data associated with the users for the purchase price, (v) transmit the user data of the matched users to the provider, and (vi) provide the matched users with a reward corresponding to the purchase price associated with the desired user data set. The computer-executable instructions may cause additional, less, or alternate actions, including those discussed elsewhere herein.

Examples of Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

I claim:

1. A telematics data marketplace (TDM) computing device for a telematics data marketplace for a plurality of providers and a plurality of users, the TDM computing device comprising one or more processors, the one or more processors configured to:
   allow, by the TDM computing device, the plurality of providers and the plurality of users to access the telematics data marketplace through a plurality of user devices associated with the plurality of users and a plurality of provider devices associated with the plurality of providers;
   receive, by the TDM computing device from one of the plurality of provider devices, a request from a provider of the plurality of providers using the one of the plurality of provider devices, the request including a data specification;
   search, by the TDM computing device, user data associated with the plurality of users based upon the data specification to generate a search result, the user data including telematics data;
   identify, by the TDM computing device, one or more users of the plurality of users based at least in part upon the search result;
   transmit, by the TDM computing device, a prompt to the one or more users, the prompt indicating that the provider requests to access user data associated with the one or more users; and
   receive, by the TDM computing device from one of the plurality of user devices, a response to the prompt from the one or more users.

2. The TDM computing device of claim 1, wherein the one or more processors are further configured to:
   provide the one or more users with a reward corresponding to a purchase price associated with the data specification, wherein the request further includes the purchase price.

3. The TDM computing device of claim 2, wherein the reward provided to the one or more users includes at least one selected from a group consisting of rewards point, carbon offset credit, digital cash payment, electronic check payment, paper check payment, and a charitable contribution.

4. The TDM computing device of claim 3, wherein the one or more processors are further configured to:
   prompt the plurality of users to choose a preferred type of reward.

5. The TDM computing device of claim 1, wherein the plurality of providers includes at least one selected from a group consisting of insurance company, merchant, financial company, municipal government, and third-party data acquirer, and wherein the data specification further includes a desired type of data and the request further includes a desired amount of users from which to receive the desired type of data.

6. The TDM computing device of claim 1, wherein the one or more processors are further configured to:

in response to the response indicating allowing access to the user data associated with the one or more users, transmit the user data associated with the one or more users to the provider; and in response to the response indicating denying access to the user data associated with the one or more users, restrict access by the provider to the user data.

7. The TDM computing device of claim 1, wherein at least a part of the user data associated with the plurality of users is collected by a plurality of sensors of the plurality of user devices, and wherein the plurality of sensors includes a GPS sensor, an accelerometer, and a gyroscope.

8. A method for a telematics data marketplace for a plurality of providers and a plurality of users, the method implemented using a telematics data marketplace (TDM) computing device including one or more processors, the method comprising:

allowing, by the TDM computing device, the plurality of providers and the plurality of users to access the telematics data marketplace through a plurality of user devices associated with the plurality of users and a plurality of provider devices associated with the plurality of providers;

receiving, by the TDM computing device from one of the plurality of provider devices, a request from a provider of the plurality of providers using the one of the plurality of provider devices, wherein the request including a data specification;

searching, by the TDM computing device, user data associated with the plurality of users based upon the data specification to generate a search result, the user data including telematics data;

identifying, by the TDM computing device, one or more users of the plurality of users based at least in part upon the search result;

transmitting, by the TDM computing device, a prompt to the one or more users, the prompt indicating that the provider requests to access user data associated with the one or more users; and receiving, by the TDM computing device from one of the plurality of user devices, a response to the prompt from the one or more users.

9. The method of claim 8, further comprising:
providing, by the one or more processors, the one or more users with a reward corresponding to a purchase price associated with the data specification, wherein the request further includes the purchase price.

10. The method of claim 9, wherein the reward provided to the one or more users includes at least one selected from a group consisting of rewards point, carbon offset credit, digital cash payment, electronic check payment, paper check payment, and a charitable contribution.

11. The method of claim 10, further comprising:
prompting the plurality of users to choose a preferred type of reward.

12. The method of claim 8, wherein the plurality of providers includes at least one selected from a group consisting of insurance company, merchant, financial company, municipal government, and third party data acquirer, and wherein the data specification further includes a desired type of data and the request further includes a desired amount of users from which to receive the desired type of data.

13. The method of claim 8, further comprising:
in response to the response indicating allowing access to the user data associated with the one or more users, transmitting the user data associated with the one or more users to the provider; and in response to the response indicating denying access to the user data associated with the one or more users, restricting access by the provider to the user data.

14. The method of claim 8, wherein at least a part of the user data associated with the plurality of users is collected by a plurality of sensors of the plurality of user devices, and wherein the plurality of sensors includes a GPS sensor, an accelerometer, and a gyroscope.

15. At least one non-transitory computer-readable media having computer-executable instructions thereon for a telematics data marketplace for a plurality of providers and a plurality of users, wherein when executed by a telematics data marketplace (TDM) computing device including one or more processors, the computer-executable instructions cause the one or more processors to:

allow, by the TDM computing device, the plurality of providers and the plurality of users to access the telematics data marketplace through a plurality of user devices associated with the plurality of users and a plurality of provider devices associated with the plurality of providers;

receive, by the TDM computing device from one of the plurality of provider devices, a request from a provider of the plurality of providers using the one of the plurality of provider devices, the request including a data specification;

search, by the TDM computing device, user data associated with the plurality of users based upon the data specification to generate a search result, the user data including telematics data;

identify, by the TDM computing device, one or more users of the plurality of users based at least in part upon the search result;

transmit, by the TDM computing device, a prompt to the one or more users, the prompt indicating that the provider requests to access user data associated with the one or more users; and receive, by the TDM computing device from one of the plurality of user devices, a response to the prompt from the one or more users.

16. The at least one non-transitory computer-readable media of claim 15, wherein the computer-executable instructions further cause the one or more processors to:
provide the one or more users with a reward corresponding to a purchase price associated with the data specification, wherein the request further includes the purchase price.

17. The at least one non-transitory computer-readable media of claim 16, wherein the reward provided to the one or more users includes at least one selected from a group consisting of rewards point, carbon offset credit, digital cash payment, electronic check payment, paper check payment, and a charitable contribution.

18. The at least one non-transitory computer-readable media of claim 17, wherein the computer-executable instructions further cause the one or more processors to:
prompt the plurality of users to choose a preferred type of reward.

19. The at least one non-transitory computer-readable media of claim 15, wherein the plurality of providers includes at least one selected from a group consisting of insurance company, merchant, financial company, municipal government, and third party data acquirer, and wherein the data specification further includes a desired type of data and the request further includes a desired amount of users from which to receive the desired type of data.

20. The at least one non-transitory computer-readable media of claim 15, wherein the computer-executable instructions further cause the one or more processors to:
  in response to the response indicating allowing access to the user data associated with the one or more users, transmit the user data associated with the one or more users to the provider; and
  in response to the response indicating denying access to the user data associated with the one or more users, restrict access by the provider to the user data.

* * * * *